United States Patent [19]

Bernard

[11] Patent Number: 5,189,126

[45] Date of Patent: Feb. 23, 1993

[54] EMULSION PRESSURE-SENSITIVE ADHESIVE POLYMERS EXHIBITING EXCELLENT GUILLOTINE PERFORMANCE

[75] Inventor: Margaret M. Bernard, La Verne, Calif.

[73] Assignee: Avery Dennison Corporation, Pasadena, Calif.

[21] Appl. No.: 848,092

[22] Filed: Mar. 9, 1992

Related U.S. Application Data

[63] Continuation-in-part of Ser. No. 567,141, Aug. 14, 1990, which is a continuation-in-part of Ser. No. 393,970, Aug. 14, 1989, abandoned.

[51] Int. Cl.$^5$ .................... C08F 26/02; C08F 120/04; C08F 222/10; C08L 33/00
[52] U.S. Cl. ...................................... 526/261; 526/87; 526/278; 526/318.43; 526/325; 526/931
[58] Field of Search ............ 524/833; 526/87, 318.43, 526/325, 931, 261, 278; 522/153

[56] References Cited

U.S. PATENT DOCUMENTS

| | | | |
|---|---|---|---|
| 4,056,503 | 11/1977 | Powanda et al. | 524/833 |
| 4,113,540 | 9/1978 | Patella et al. | 524/833 |
| 4,222,780 | 9/1980 | Shibatani et al. | 526/278 |
| 4,368,043 | 1/1983 | Yamanchi et al. | 526/278 |
| 4,420,597 | 12/1983 | Gruber | 526/261 |
| 4,507,429 | 3/1985 | Lenney | 526/210 |
| 4,537,940 | 8/1985 | Omura et al. | 526/278 |
| 4,564,664 | 1/1986 | Chang et al. | 524/833 |
| 4,619,964 | 10/1986 | Kielbania et al. | 524/833 |
| 4,694,056 | 9/1987 | Lenney | 526/210 |
| 4,725,639 | 2/1988 | Lenney | 525/301 |
| 4,739,004 | 4/1988 | Sekmakas et al. | 524/833 |
| 4,826,938 | 5/1989 | Mudge | 526/261 |
| 4,983,656 | 1/1991 | Ito et al. | 524/833 |
| 5,011,867 | 4/1991 | Mallya et al. | 524/833 |
| 5,041,495 | 8/1991 | Schwerzel et al. | 524/833 |

FOREIGN PATENT DOCUMENTS

| | | | |
|---|---|---|---|
| 0147067 | 7/1985 | European Pat. Off. | 524/833 |
| 0212358 | 3/1987 | European Pat. Off. | 524/833 |
| 0146604 | 2/1981 | Fed. Rep. of Germany | 524/833 |
| 2070037 | 9/1981 | United Kingdom | 524/833 |

*Primary Examiner*—Joseph L. Schofer
*Assistant Examiner*—N. Sarofim
*Attorney, Agent, or Firm*—Christie, Parker & Hale

[57] ABSTRACT

There is provided inherently tacky, emulsion pressure-sensitive adhesive polymers comprising about 35 to about 65 percent by weight alkyl acrylates, about 15 to about 35 percent vinyl esters, about 20 to about 35 percent by weight diesters di-carboxylic acid, about 0.1 to 1 percent by weight of a reactive multifunctional monomer and up to about 10 percent by weight of an unsaturated carboxylic acids. The polymers are formed in the presence of a reactive surfactant, with or without a chain transfer agent. The preferred polymers have a glass transition temperature less than about −20° C. and a gel content of at least 60 percent by weight.

21 Claims, No Drawings

EMULSION PRESSURE-SENSITIVE ADHESIVE POLYMERS EXHIBITING EXCELLENT GUILLOTINE PERFORMANCE

CROSS-REFERENCE TO RELATED APPLICATIONS

This is a continuation-in-part of application Ser. No. 07/567,141 filed Aug. 14, 1990 which is a continuation-in-part of application Ser. No. 07/393,970, filed Aug. 14, 1989 now abandoned, each incorporated herein by reference.

BACKGROUND OF THE INVENTION

The present invention relates to polymers which are inherently tacky and, as formed, are functional as pressure-sensitive adhesives. More particularly, the adhesives of the instant invention have excellent guillotinability, room- and elevated-temperature adhesive performance and provide an ecologically safe replacement for solvent adhesives and many acrylic- and rubber-based emulsion adhesives. The adhesives of the instant invention are prepared by emulsion polymerization.

Guillotinability is a critical requirement in film applications where pressure-sensitive adhesive (PSA) coated products are cut into sheet stock. During the process of guillotining it is expected that the adhesive will not build on the blades so that subsequent cutting is not affected and the cut sheets separate individually without sticking together. Solvent adhesives are commonly used in such applications due to the performance benefits they offer. Environmental constraints imposed on the use of solvents has caused the PSA industry to move away from solvent systems. The best alternative to day is the water borne adhesive technology due to adhesive user friendliness and the cost advantages. Obtaining high performance from water borne adhesive systems is the major task which the PSA industry is facing.

In terms of the instant invention U.S. Pat. Nos. 4,507,429, 4,694,056, and 4,725,639 to Lenney, and assigned to Air Products, Inc., pertain to a pressure-sensitive adhesive compositions and disclose increasing cohesive strength by use of polyfunctional monomers which include polyvinyl and polyallyl compounds including triallyl isocyanurate. Product glass transition temperature may be as high as −15° C., limiting utility at reduced temperature.

We have sought to provide pressure-sensitive adhesives of improved properties which have broad utility including excellent guillotinabilty.

SUMMARY OF THE INVENTION

According to the present invention, there is provided inherently tacky acrylic emulsion adhesive polymers which exhibit excellent guillotinability and have excellent adhesion to a wide variety of surfaces ranging from polar, relatively high energy surfaces such as stainless steel to nonpolar, relatively low energy surfaces such as polyethylene and to difficult-to-bond surfaces such as corrugated board. Moreover, cohesion and adhesion at room and elevated temperatures is excellent and, when part of a laminate stock such as pressure-sensitive adhesive label stock, provides excellent high-speed converting characteristics such as die cutting, matrix stripping and fan folding. Superior properties are obtained even at lower-than-normal coat weights. In sum, the adhesive polymers are broad-based and serve to replace many solvent-based adhesives on an ecologically safe basis as well as many emulsion-based adhesives, thus serving a variety of markets.

The inherently tacky, emulsion pressure-sensitive adhesive polymers of the instant invention comprise, on a polymerized basis and based on the total weight of the polymer of at least one and preferably a mixture of alkyl acrylates containing from about 4 to about 8 carbon atoms in the alkyl group, with the preferred mixture being a mixture of 2-ethylhexyl acrylate and butyl acrylate, the total of said alkyl acrylates being present in a total amount of from about 35 to about 60 percent by weight; at least one vinyl ester containing from 2 to about 16 carbon atoms in the alkyl chain of the acid, preferably vinyl acetate, said vinyl ester present in a total amount of from about 15 to about 35 percent by weight; at least one diester of a dicarboxylic acid wherein each alkyl group of the diester independently contains from about 6 to about 12 carbon atoms, with di-2-ethylhexyl maleate or di-2-ethylhexyl fumarate being preferred, said diesters being present in a total amount of from about 15 to about 30 percent by weight; about 0.1 to about 1 percent of a multifunctional monomer having a cyanurate or phosphate functionality with tris(2-hydroxyethyl) isocyanurate triacrylate and bis(-methacryloxyethyl) phosphate presently preferred; up to about 10 percent by weight, preferably about 2 to 5 percent, of an unsaturated carboxylic acid containing from 3 to about 5 carbon atoms, preferably acrylic and/or methacrylic acid, said emulsion polymer having a gel content in excess of 60 percent by weight of the polymer.

The emulsion adhesive polymers of the instant invention are prepared by using a reactive surfactant which polymerizes and becomes part of the emulsion polymer and which has been observed to enhance cohesive strength and aid in copolymerization of the monomers in forming the emulsion pressure-sensitive adhesive polymers of the instant invention. The amount of reactive surfactant employed in the preparation of the emulsion pressure-sensitive adhesives of the present invention is present in a positive amount up to about 0.4 percent by weight of the total monomers, preferably from about 0.1 to about 0.25 percent by weight. The preferred reactive surfactants are anionic vinyl functional surfactants, such as sodium vinyl sulfonate and sodium styrene sulfonate.

The emulsion adhesives of the instant invention may be prepared with excellent conversions at reaction temperatures ranging from 70° to about 85° C. in the presence of from about 0.5 to about 1 percent by weight, based on the weight of the monomers, of a persulfate or equivalent catalyst, with the monomer mix being fed over a period of about 4 to about 5 hours. Reaction pH is from about 2.5 to about 7.0. Conversion is high, approaching 100 percent at the reaction conditions set forth above.

The polymers are modified by cross-linking reactions using multifunctional monomers alone or with metal salts, organometallic complexes, electron beam radiation, actinic radiation, or heat. A significant improvement in cohesive strength can be achieved without much loss of peel and tack by incorporating small amounts of multifunctional monomers preferably having cyanurate or phosphate moieties in the pendent chain, with or without a chain transfer agent, and additionally by cross-linking the polymers using metal salts such as aluminum acetate. We have found that multifunctional acrylate without said moieties are not effective in improving guillotinability and elevated temperature performance.

The present invention provides a low cost water borne pressure-sensitive adhesive with high guillotinability and adhesive performance including room temperature and elevated temperature aging. The multifunctional monomers used in this invention provide hydrogen bonding with functional groups such as carboxy groups and enhance adhesion to polar substrates without affecting peel and tack. Shear performance is further enhanced by metal cross-linking. This creates a highly cohesive net work which enhances guillotine performance.

DETAILED DESCRIPTION

The present invention relates to pressure-sensitive adhesive compositions based on emulsion polymers which provide excellent processability especially guillotinability and high adhesion and high tack to polar, nonpolar and difficult-to-bond substrates with excellent cohesion. The adhesives have properties sufficient to make them useful for replacing solvent polymers, tackified styrene-butadiene emulsion pressure-sensitive adhesives, and nontackified and tackified acrylic pressure-sensitive adhesives. An improvement exhibited over tackified styrene-butadiene resin adhesives include better aging and no edge ooze or bleed as part of a release liner adhesive face stock laminate. In addition, being functional as a single polymer, there is a minimal or no need for compounding and tackification. The improved performance characteristics of the adhesive of the instant invention enable them to be used on almost any available face stock. Properties induced in the adhesive by proper selection of monomers and surfactants give excellent moisture resistance enabling the adhesive to be used for medical and moisture-resistant pressure-sensitive adhesive applications.

As compared to prior art acrylic pressure-sensitive adhesives which do not give good adhesion to nonpolar surfaces, such as polyolefins and certain other surfaces such as recycled corrugated board, without tackification with attendant sacrifice in cohesive strength and elevated-temperature performance, the adhesives prepared in accordance with the instant invention have excellent adhesion to both polyolefins and corrugated board and good elevated-temperature performance. The adhesives are more universal in their use, a result not heretofore achieved in single polymer adhesives.

The emulsion based pressure-sensitive adhesives of the instant invention contain, on a percent by weight basis from about 35 to about 60 percent by weight total, of at least one of the alkyl acrylates containing about 4 to about 8 carbon atoms in the alkyl group. Preferably, a mixture of alkyl acrylates are employed with the total alkyl acrylate concentration, in an amount of from about 40 to about 50 percent by weight of the monomers. Useful alkyl acrylates include n-butyl acrylate, 2-ethylhexyl acrylate, isooctyl acrylate, and the like, with a mixture 2-ethylhexyl acrylate and butyl acrylate being preferred.

The second monomeric component is one or more vinyl esters present in a total amount of from about 15 to about 35 percent by weight, preferably from about 20 to about 25 percent by weight based on total weight of the monomers, said vinyl esters containing from 2 to about 16 carbon atoms in the alkyl group of the acid. Representative of the vinyl esters include vinyl acetate, vinyl butyrate, vinyl propionate, vinyl isobutyrate, vinyl valerate, vinyl versitate, and the like. Vinyl acetate is preferred.

The third component of the emulsion polymers of the instant invention are one or more diesters of a dicarboxylic acid and mixtures thereof, present in a total amount of from about 15 to about 30 percent by weight based on the total weight of the monomers. Each ester group of the diester of the dicarboxylic acid independently contains from about 6 to about 12, preferably from about 8 to about 12, carbon atoms. The preferred diesters are di-2-ethylhexyl maleate, di-2-ethylhexyl fumarate and mixtures thereof.

A fourth component of the instant invention is a reactive multifunctional monomer which is an acrylate and/or methacrylate having a cyanurate or phosphate moiety and present in an amount of from 0.1 to about 1 percent by weight of the monomers. The multifunctional monomers improve guillotinability without adversely affecting adhesive properties. The presently preferred multifunctional monomers are tris-(2-hydroxyethyl)isocyanurate triacrylate and bis-(methacryloxyethyl) phosphate.

A fifth component of the instant invention is at least one unsaturated carboxylic acid containing from about 3 to about 5 carbon atoms and present in a total amount of up to about 10 percent by weight of the polymer, preferably from 1 to about 5 percent by weight. The unsaturated carboxylic acid includes, among others, acrylic acid, methacrylic acid, itaconic acid, and the like. Acrylic acid, methacrylic acid, and more preferably mixtures thereof, are presently preferred.

The emulsion adhesives of the instant invention are preferably prepared in the presence of a reactive surfactant which polymerizes during formation of the polymer and becomes an integral part of the polymer. Preferred reactive surfactants include anionic vinyl functional monomers such as sodium vinyl sulfonate and sodium styrene sulfonate and the like. The reactive surfactant is present as part of the total surfactant system and in an amount up to about 0.4 percent by weight of the total monomers, preferably about 0.1 to about 0.25 percent by weight.

Presently preferred emulsion polymers contain, exclusive of reactive monomers, about 25 to 35 percent by weight 2-ethylhexyl acrylate, about 15 to 25 percent by weight butyl acrylate, about 20 to 25 percent by weight vinyl acetate, about 15 to 25 percent by weight di-2-ethylhexyl maleate (dioctyl maleate), about 0.5 percent by weight tris-(2-hydroxyethyl) isocyanurate triacrylate, about 2 percent by weight acrylic acid, and about 2 percent by weight methacrylic acid.

The monomer proportions are normally adjusted in such a way that the adhesive has a glass transition temperature less than about $-20°$ C., giving a good balance of adhesion and tack at room temperature and elevated temperatures. The emulsion polymers of this invention have a very broad glass transition temperature range of from $15°$ to $30°$ C., which is unusual among acrylic polymers. Conventional acrylic polymers, for instance, have a glass transition temperature range of only $10°$ to $15°$ C. Depending on polymerization conditions, copolymers showing two distinct glass transition temperatures, have been observed.

Gel content or percent insolubles are in excess of 60 percent by weight which provides excellent cohesive strength. In this regard, gel represents the amount of polymer which is insoluble in tetrahydrofuran expressed in percent by weight and determined by the membrane gel partitioning method. In this method, about 600 to 800 milligrams of 100 percent solid polymer is weighed onto a millipore membrane disk of 5 micrometer porosity. The disk is heat sealed and transferred to a scintillation vial. About 20 milliliters of tetrahydrofuran is added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Percent insoluble} = \frac{(b - c) \times 100}{a} = \% \text{ gel}$$

wherein
a = a total weight of 100 percent solids polymer
b = the weight of the polymer plus membrane before tetrahydrofuran treatment
c = polymer plus membrane remaining after tetrahydrofuran treatment.

Polymer properties can be further modified to fit end use applications by inclusion of multifunctional monomers and the use of other chemical cross-linking agents. Other aids which may be used to develop cross-linking include thermal cross-linking and cross-linking by actinic and electron beam radiation.

Polymers of the instant invention are prepared by emulsion polymerization under conditions of agitation in an autogenous atmosphere in the presence of suitable polymerization initiators such as peroxydisulfate and peroxides. Depending on desired polymer properties including gel content, the preferred levels of these initiators are in the range of from about 0.5 to about 1.0 percent by weight based on the total weight of the monomers. The presently preferred initiators are potassium persulfate, t-butyl hydrogen peroxide, and the like. Level of agitation will vary depending on the system and will influence conversion. Typically, about 30 to 50 percent of the total initiator is added along with an initial monomer charge to the reactor, and the rest is added along with the balance monomers during polymerization over a period of from about 4 to about 5 hours. For the polymer to be free from coagulum and to maintain grit levels less than 20 ppm, it is desirable to maintain the pH of the emulsion during polymerization between from about 2 to about 4, preferably from about 2.5 to about 4. This can be achieved by the use of buffers such as sodium bicarbonate and sodium acetate, typically in amounts up to 0.3 percent by weight based on the weight of the monomer.

The stabilizer system used during polymerization contains a combination of anionic and nonionic surfactants present in an amount up to about 3.5 percent by weight based on the weight of the monomers. A suitable anionic surfactant is the sodium salt of an ethoxylated nonylphenol sulfate, and a suitable nonionic surfactant is ethoxylated nonylphenol. The best balance of properties is achieved by maintaining the anionic to nonionic surfactant ratio approximately 3 to 1.

Polymers of the instant invention are produced at high solids level content, typically about 50 to about 70 percent by weight. Reaction is carried out at temperatures from 70° to 85° C. with an initial charge of up to about 10 percent by weight of the total monomers, with the balance of the monomers being added to the emulsion reaction system over a period of about 4 to about 5 hours, with total monomer conversion approaching 100 percent.

It is possible to modify the rheology of the polymer for coating purposes by use of conventional thickeners such as SCT-270 manufactured and sold by Union Carbide and present in an amount up to 0.2 percent by weight. Although not required, it is also feasible to modify the properties by the use of tackifiers and the like. For general purpose applications, it is desirable to have good adhesion to both hydrophobic substrates such as polyethylene and hydrophilic substrates such as stainless steel and difficult-to-bond recycled corrugated board. Prior art acrylic polymers do not have good adhesion to such substrates unless they are modified by addition of a tackifier. This is not required using the pressure-sensitive adhesive polymer of this invention although tackifiers can be effectively used to tailor adhesion to a substrate.

In accordance with the present invention, there is also provided emulsion pressure-sensitive adhesive polymers with high shear performance even at elevated temperature with little or no detriment in peel and tack adhesion which can be used to replace high cost solvent acrylic polymers used in film applications. The di-2 ethylhexyl maleate in the composition provides tackiness to the adhesive and allows the use of vinyl acetate which provides good peel adhesion without the use of high levels of acid monomer which tends to reduce tack.

The presence of the multifunctional monomer in the copolymer itself provides some improvement in shear performance which may not be sufficient enough for high performance film applications. Further cross-linking by complex formation with metal salts dramatically enhances the shear in excess of 10,000 min. Elevated temperature (70° C.) shear is also greatly improved, equalling the performance of the emulsion polymers to solvent acrylic systems. Adding multifunctional monomers to the copolymer may alter the gel content and/or glass transition temperature of the adhesive. Accordingly, when multifunctional monomers are used, they are added in an amount that yields an adhesive that is pressure-sensitive, i.e., the glass transition temperature is sufficiently low as to enable use as a PSA.

To maintain good balance of peel and tack with high shear it may be desirable to lower the molecular weight of the polymer by the use of chain transfer agents such as n-dodecyl mercaptan(n-DDM) and to use higher levels of initiator than what is commonly used. An optimum level of n-DDM in this invention is up to about 0.025 percent by weight of the monomers, preferably about 0.005 to about 0.01 percent by weight, and to employ a level of initiator of about 0.6 to about 0.75 percent by weight based on the weight of the monomer composition. Amounts exceeding these levels can result in cohesive failure in peel adhesion on certain substrates which will be detrimental to the product application. Aluminum acetate, if present, is normally present in an amount up to about 0.25 percent by weight of the monomers.

EXAMPLES 1 TO 4 AND CONTROLS 1 AND 2

To a one liter reactor equipped with a reflux condenser, a thermocouple, a pitched turbine agitator and a nitrogen inlet tube, there was charged a solution containing 75 g of deionized water, 2.5 g of sodium vinyl sulfonate (25 percent w/w solution in water) and 0.36 g of an anionic surfactant (Polystep B-27, a sodium salt of ethoxylated nonylphenol sulfate manufactured and sold by Stepan Chemical Co.). A monomer mix consisting of 175 g of 2-ethylhexyl acrylate, 125 g of di-2 ethylhexyl maleate, 105 g of vinyl acetate, 5 g of acrylic acid, 5 g of methacrylic acid and 2.25 g of tris (2-hydroxy-ethyl) isoyanurate was added to 117.6 g of water containing 43.6 g of Polystep B-27 and 6.37 g of Polystep F-9 and agitated to make a pre-emulsion. The reactor charge was heated under nitrogen to 72°–75° C., to which was added 20.93 g of a 4.46 w/w potassium persulfate solution in deionized water. After a few minutes 66 grams of the pre-emulsified monomer and 10.46 g of potassium persulfate solution were added to the reactor over 20 to 30 minutes. To the remaining pre-emulsion there was added a pre-mixed solution containing 2.4 g water, 0.9 g, Polystep B-27, 0.13 g Polystep F-9, 5 g each of methacrylic acid and acrylic acid and 0.025 gm. n-DDM. After the temperature reached a steady state, the remaining monomer pre-emulsion and a 2.07% aqueous solution of potassium persulfate buffered with sodium bicarbonate were introduced into the reactor at respective rates of 2.25 and 0.275 g/min. for a period of 270–280 minutes. The reactor temperature was maintained between 79° to 82° C. Thirty minutes after the feed, a 2.625 g 4.8% solution of potassium persulfate was added and maintained for 45 minutes. A second solution of 2.625 g was again added and maintained for 45 minutes. Once the polymerization was complete, the contents were cooled to ambient temperature neutralized with ammonia to a pH of 5.5–6.5 and discharged. The polymer had 58.9 percent solids, and a Tg of −32° C.

Using the above procedure with n-DDM being omitted the polymers listed in Table 1 were prepared.

For examples 10 to 18 the monomers of 2 to 9 were polymerized except that the monomer composition includes 0.025 g of n-DDM as in Example 1.

Table 2 shows the quillotine performance of the emulsion polymer of Example 1 and some polymers from Table 1. As can be seen, from Table 2 most of the polymers show excellent quillotine performance. The lowest rating is very good indicative of the fact that these compositions will perform well on the quillotine press for sheeting of PSA constructions.

TABLE 2

| | Guillotine Performance | |
|---|---|---|
| Example | Rating Blade* | Smear* |
| Ex 1 | 1.5 | 1.5 |
| Ex 1, plus 0.06% Al acetate | 1–1.5 | 1–1.5 |
| Ex 2 | 2 | 2 |
| Ex 3 | 1–1.5 | 2 |
| Ex 4 | 1.5 | 1.5 |
| Ex 5 | 1.5 | 1.5 |
| Ex 6 | 1.5 | 1.5 |

*Blade and smear ratings
1 = Excellent
2 = Very Good
3 = Good
4 = Fair
5 = Poor
6 = Very Poor Table 3 shows the performance on paper (litho) both initial and after aging for one and three weeks at 70° C. for the samples so far tested. The samples were coated on release liner at a coat weight of 22–24 g/sqm and then laminated to paper. It is evident from the table, aging improves the shear performance without sacrificing the peel and tack adhesion, a phenomenon which is unusual and unique since normally all pressure-sensitive adhesives tend to loose adhesion properties on aging at

TABLE 1

| Example | Monomer composition | Weight Ratio % | % Solids |
|---|---|---|---|
| Ex. 2 | 2-EHA/DOM/VAc/BA/HEITA/AA/MAA | 30/25/21/20/0.45/2/2 | 58.6 |
| Ex. 3 | " | 30/25/21/20/0.60/2/2 | 58.5 |
| Ex. 4 | " | 30/25/21/20/0.80/2/2 | 58.4 |
| Ex. 5 | 2-EHA/DOM/VAc/BA/trisHIT/AA/MAA | 25/25/21/25/0.45/2/2 | 58.6 |
| Ex. 6 | " | 25/25/21/25/0.60/2/2 | 58.6 |
| Ex. 7 | " | 25/25/21/25/0.80/2/2 | 59.1 |
| Ex. 8 | " | 26/20/25/25/0.60/2/2 | 58.0 |
| Ex. 9 | 2-EHA/DOM/VAc/BA/bisMOEP/AA/MAA | 30/25/21/20/0.40/2/2 | 58.1 |
| Control 1 | 2-EHA/DOM/VAc/BA/AA/MAA | 30/25/21/20/2/2 | 59.25 |
| Control 2 | " | 25/25/21/25/2/2 | 58.25 |

2-EHA = 2-ethylhexyl acrylate
DOM = di(2-ethylhexyl) maleate
VAc = vinyl acetate
BA = butyl acrylate
HEITA = tris(2-hydroxyethyl)isocyanurate triacrylate
bixMOEP = bis(methacryloxyethyl)phosphate elevated temperatures, some drastically and some to a lesser extent, especially when there is a shear improvement.

TABLE 3

| | Performance on Paper (Litho) | | | | | | | | |
|---|---|---|---|---|---|---|---|---|---|
| | Initial 90 Peel | Loop Tack | RTS | 1 Wk/ 70° C. 90 Peel | Loop Tack | RTS | 3 Wks/ 70° C. 90 Peel | Loop Tack | RTS |
| Sample # | N/M | N/M | Min. 500 g | N/M | N/M | Min. 500 g | M/n | N/m | Min. 500 g |
| Ex 1 | 488 pt | 660 | 1660 C | — | — | 6430 C | | | |
| Ex 1 0.12AA | 480 pt | 675 | 3200 ps/c | — | — | 8450 ps | | | |
| Ex 2 | 354 pt | 574 | 4130 ps/c | 331 pt | 520 | 6185 C | 401 pt | 575 | 8600 C |
| Ex 4 | 360 pt | 600 | 6924 C | 370 pt | 583 | 8000+ | 400 pt | 570 | — |
| Ex 5 | 400 pt | 590 | 2350 ps/c | 383 pt | 640 | — | 360 pt | 615 | 3000+ |
| Ex 6 | 470 pt | 710 | 6000+ | 425 pt | 660 | 6000+ | 425 pt | 617 | 10,000+ |
| Ex 7 | 415 pt | 700 | 1600 C | 420 pt | 570 | 2300 C | | | |

TABLE 3-continued

| | Performance on Paper (Litho) | | | | | | | | |
|---|---|---|---|---|---|---|---|---|---|
| Sample # | Initial 90 Peel N/M | Loop Tack N/M | RTS Min. 500 g | 1 Wk/ 70° C. 90 Peel N/M | Loop Tack N/M | RTS Min. 500 g | 3 Wks/ 70° C. 90 Peel M/n | Loop Tack N/m | RTS Min. 500 g |
| Ex 8 | 480 pt | 700 | 1386-ps | 440 pt | 627 | 2400 ps | 420 pt | 655 | — |
| Control 1 | 465 pt | 730 | 6200 C | 433 pt | 685 p | 4600 ps | 438 pt | 635 | — |

AA = Aluminum acetate
C = Cohesive failure
ps = Panel Stain
pt = Facestock Tare

Table 4 illustrates the performance on mylar, initial as well as 70° C. aging. All the samples were coated on mylar at a coat weight of 25–30 g/sqm. Again it is apparent that the adhesion properties are not affected by aging irrespective of the facestock. Whereas the AAEMA containing polymers do show some adhesion loss on aging (Table 8 in U.S. application Ser. No. 393,970).

TABLE 4

| | Performance on Polyester (mylar) film | | | | | |
|---|---|---|---|---|---|---|
| | 180 Peel N/m | | Loop Tack N/m | | RTS 500 g | 70° C. Shear 1 Kg. |
| Sample # | 20 min. | 1 wk, @ 70° C. | 20 min. | 1 wk, @ 70° C. | ½ × ½" min. | 1 × 1" min. |
| Ex 1 | 395 | 355 | 370 | 395 | 3000+ | — |
| Ex 1 0.12AA | 320 | 390 | 420 | 435 | 10000+ | 10000+ |
| Ex 3 | 450 | 445 | 590 | 500 | 3225 C | — |
| Ex 3 0.12AA | 390 | 445 | 520 | 550 | 10000+ | — |
| Ex 6 | 345 | 420 | 445 | 510 | — | — |
| Control 1 | 385 | 430 | 355 | 375 | 2350 C | — |

The polymers of the present invention also exhibit very high elevated temperature shear exceeding 10000+ minutes showing its utility in high performance tapes such as automotive tapes. The elevated temperature shear was measured at 70° C. using 1"×1" sample, with 24 dwell time, on a 1 Kg load.

The adhesives of the present invention also show very good mandrel performance to make them suitable for pharmaceutical applications where solvent adhesives are currently are used. Examples 1, ¾ and 6 were tested for mandrel on 0.25 inch diameter glass tube and 0.5 inch diameter polyethylene rod. All the samples gave a rating of 3.5–4 indicative of very minimal lift (<1/16 inch) and the suitable applicability of the polymer on curved substrates.

What is claimed is:

1. An inherently tacky, pressure-sensitive adhesive polymer formed by emulsion polymerization, which polymer comprises, on a polymerized basis and based on the total weight of the monomers:
   (a) at least of one alkyl acrylates containing from about 4 to about 8 carbon atoms in the alkyl group, the total amount of alkyl acrylate present being from about 35 to about 60 percent by weight;
   (b) at least one vinyl ester containing from 2 to about 16 carbon atoms in the alkyl group of the acid, the total amount of the vinyl ester present being from 15 to about 35 percent by weight;
   (c) at least one diester of a dicarboxylic acid in which each alkyl group of the diester independently contains from about 6 to about 12 carbon atoms, the total of the diesters present being in an amount from about 15 to about 30 percent by weight;
   (d) at least one reactive multifunctional monomer, the total amount of multifunctional monomer having a cyanurate or phosphate functionality present being from 0.1 to about 1 percent by weight; and
   (e) at least one unsaturated carboxylic acid containing from about 3 to about 5 carbon atoms, present in the total of the unsaturated carboxylic acid in a positive amount up to about 10 percent by weight of the monomers, said polymer being formed in the presence of vinyl functional reactive surfactant, and having a gel content in excess of about 60 percent by weight of the polymer.

2. A pressure-sensitive adhesive polymer as claimed in claim 1 in which the alkyl acrylates are present in a total amount of from about 40 to about 50 percent by weight of the monomers.

3. A pressure-sensitive adhesive polymer as claimed in claim 2 in which the alkyl acrylate is a mixture of 2-ethylhexyl acrylate and butyl acrylate.

4. A pressure-sensitive adhesive polymer as claimed in claim 1 in which the vinyl ester is present in a total amount of from about 20 to about 25 percent by weight based on the total weight of the monomers.

5. A pressure-sensitive adhesive as claimed in claim 4 in which the vinyl ester is vinyl acetate.

6. A pressure-sensitive adhesive polymer as claimed in claim 1 in which the diester of a dicarboxylic acid independently contains from about 8 to about 12 carbon atoms in each alkyl group.

7. A pressure-sensitive adhesive polymer as claimed in claim 6 in which the diester of the dicarboxylic acid is selected from the group consisting of di-2-ethylhexyl maleate, di-2-ethylhexyl fumarate, and mixtures thereof.

8. A pressure-sensitive adhesive polymer as claimed in claim 1 in which the unsaturated carboxylic acid is present in an amount of from about 2 to about 5 percent by weight of the total monomers.

9. A pressure-sensitive adhesive polymer as claimed in claim 8 in which the unsaturated carboxylic acid is selected from the group consisting of acrylic acid, methacrylic acid, and mixtures thereof.

10. The pressure-sensitive adhesive polymer as claimed in claim 1 in which the vinyl functional monomer is selected from the group consisting of sodium vinyl sulfonate and sodium styrene sulfonate and present in an amount up to 0.4 percent by weight based on the total weight of the monomers.

11. A pressure-sensitive adhesive polymer as claimed in claim 10 in which the reactive surfactant is present in an amount of 0.1 to about 0.25 percent by weight of the total monomers.

12. A pressure-sensitive adhesive as claimed in claim 1 in which the reactive multifunctional monomer is selected from the group consisting of tris(2-hydroxyethyl) isocyanurate triacrylate, bis(methacryloxyethyl) phosphate and mixtures thereof.

13. A pressure-sensitive adhesive as claimed in claim 3 in which the reactive multifunctional monomer is selected from the group consisting of tris(2-hydroxyethyl) isocyanuratetriacrylate, bis(methacryloxyethyl) phosphate and mixtures thereof.

14. A pressure-sensitive adhesive as claimed in claim 5 in which the reactive multifunctional monomer is selected from the group consisting of tris(2-hydroxyethyl) isocyanuratetriacrylate, bis(methacryloxyethyl) phosphate and mixtures thereof.

15. A pressure-sensitive adhesive as claimed in claim 7 in which the reactive multifunctional monomer is selected from the group consisting of tris-(2-hydroxyethyl) isocyanurate triacrylate, bis-(methacryloxyethyl) phosphate and mixtures thereof.

16. A pressure-sensitive adhesive as claimed in claim 9 in which the reactive multifunctional monomer is selected from the group consisting of tris-(2-hydroxyethyl) isocyanurate triacrylate, bis-(methacryloxyethyl) phosphate and mixtures thereof.

17. An inherently tacky emulsion pressure-sensitive adhesive polymer comprising on a polymerized basis, from about 25 to about 35 percent of 2-ethylhexyl acrylate from about 15 to about 25 percent by weight butyl acrylate, from about 20 to about 25 percent by weight vinyl acetate; from about 15 to about 25 percent by weight of a diester of a dicarboxylic acid selected from a group consisting of di-2-ethylhexyl maleate and di-2-ethylhexyl fumarate and mixtures thereof; about 2 to about 5 percent by weight of unsaturated carboxylic acids selected from the group consisting of acrylic acid and methacrylic acid, from 0.1 to about 1 percent by weight of a reactive multifunctional monomer selected from the group consisting of tris(2-hydroxyethyl) isocyanurate triacrylate and bis(methacryloxyethyl) phosphate, said polymer being formed in the presence of an anionic reactive surfactant selected from the group consisting of sodium vinyl sulfonate and sodium styrene sulfonate provided in a positive amount of up to about 0.4 percent by weight of the total monomers, said emulsion polymer having a gel content in excess of about 60 percent by weight of the polymer.

18. A pressure-sensitive adhesive polymer as claimed in claim 1 in which the polymer is formed in the presence of up to about 0.02 percent by weight of the monomers of n-dodecyl mercaptan.

19. A pressure-sensitive adhesive polymer as claimed in claim 3 in which the polymer is formed in the presence of up to about 0.02 percent by weight of the monomers of n-dodecyl mercaptan.

20. A pressure-sensitive adhesive polymer as claimed in claim 14 in which the polymer is formed in the presence of up to about 0.02 percent by weight of the monomers of n-dodecyl mercaptan.

21. A pressure-sensitive adhesive polymer as claimed in claim 17 in which the polymer is formed in the presence of up to about 0.02 percent by weight of the monomers of n-dodecyl mercaptan.

* * * * *

UNITED STATES PATENT AND TRADEMARK OFFICE
CERTIFICATE OF CORRECTION

PATENT NO. : 5,189,126

DATED : February 23, 1993

INVENTOR(S) : Margaret M. Bernard

It is certified that error appears in the above-identified patent and that said Letters Patent is hereby corrected as shown below:

On the Title Page

Abstract, line 7, change "acids" to -- acid --.

Column 1, line 34, change "to day" to -- to date --.
Column 1, line 41, after "pertain to" delete "a".

Column 3, line 60, after "mixture" insert -- of --.

Column 7, line 7, change "isoyanurate" to
-- isocyanurate --.

Column 8, line 3, change "includes" to -- included --.
Column 8, line 30, change "g/sqm" to -- g/sq m --.
Column 8, line 35, change "loose" to -- lose --.
Column 8, line 60, & Column 9, line 4, in the Table change "90 Peel" to -- 90° Peel -- (all occurrences).

Column 9, line 16, change "g/sqm" to -- g/sq m --.
Column 9, line 25, in the Table change "180 Peel" to -- 180° Peel --.
Column 9, line 43, after "currently" delete "are".

UNITED STATES PATENT AND TRADEMARK OFFICE
CERTIFICATE OF CORRECTION

PATENT NO. : 5,189,126

DATED : February 23, 1993

INVENTOR(S) : Margaret M. Bernard

It is certified that error appears in the above-identified patent and that said Letters Patent is hereby corrected as shown below:

Column 9, line 54, after "at least" delete "of".

Column 10, line 17, after "about 3" delete the period.

Signed and Sealed this

Thirty-first Day of May, 1994

*Attest:*

BRUCE LEHMAN

*Attesting Officer*  *Commissioner of Patents and Trademarks*